United States Patent [19]
Pelton et al.

[11] Patent Number: 5,651,609
[45] Date of Patent: Jul. 29, 1997

[54] CONVECTION VENTING LENSED REFLECTOR-TYPE COMPACT FLUORESCENT LAMP SYSTEM

[76] Inventors: Bruce A. Pelton, 825 Manor Rd.; Michael Siminovitch, 829 Manor Rd., both of El Sobrante, Calif. 94803

[21] Appl. No.: 349,893

[22] Filed: Dec. 6, 1994

[51] Int. Cl.⁶ .................................................. F21V 29/00
[52] U.S. Cl. ..................... 362/294; 362/218; 362/224; 362/291; 362/292; 362/309; 362/332; 362/345; 362/456
[58] Field of Search .................................. 362/216, 218, 362/222, 223, 264, 290, 291, 292, 294, 298, 308, 309, 327, 328, 331–336, 342, 345, 346, 373, 455, 456, 96, 224

[56] References Cited

U.S. PATENT DOCUMENTS

| | | | |
|---|---|---|---|
| 950,600 | 3/1910 | Perry | 362/298 |
| 1,272,509 | 7/1918 | Palmer | 362/342 |
| 1,558,570 | 10/1925 | Adams | 362/298 |
| 1,985,460 | 12/1934 | Raven | 362/327 |
| 2,204,430 | 6/1940 | Montague | 362/298 |
| 2,469,412 | 5/1949 | Roebken | 362/298 |
| 2,700,098 | 1/1955 | Brouwer | 362/308 |
| 4,214,168 | 7/1980 | Kulka | 362/311 |
| 4,270,071 | 5/1981 | Morton | 315/62 |
| 4,363,083 | 12/1982 | Tanaka et al. | 362/216 |
| 4,409,646 | 10/1983 | Baliozian | 362/346 |
| 4,479,173 | 10/1984 | Rumpakis | 362/294 |
| 4,503,360 | 3/1985 | Bedel | 315/112 |
| 4,858,089 | 8/1989 | Pietro | 362/294 |
| 5,072,349 | 12/1991 | Waniga | 362/294 |

FOREIGN PATENT DOCUMENTS

345604  12/1904  France ................................. 362/455

*Primary Examiner*—Alan Cariaso
*Attorney, Agent, or Firm*—Paula N. Chavez

[57] ABSTRACT

Disclosed herein is a fluorescent lamp housing assembly capable of providing convection cooling to the lamp and the ballast. The lens of the present invention includes two distinct portions, a central portion and an apertured portion. The housing assembly further includes apertures so that air mass is able to freely move up through the assembly and out ventilation apertures.

25 Claims, 9 Drawing Sheets

CONVECTION VENTING LENSED REFLECTOR-TYPE COMPACT FLUORESCENT LAMP SYSTEM

The invention described herein was partially made with Government support under Contract No. DE-AC03-76SF00098 between the U.S. Department of Energy and the University of California for the operation of Lawrence Berkeley Laboratory. The Government has certain rights in this invention.

FIELD OF THE INVENTION

The present invention relates to an improved compact fluorescent lamp retrofit fixture design and more specifically, a lens element providing venting geometries and a ballast housing element further providing venting geometries.

BACKGROUND OF THE INVENTION

Fluorescent lamp assemblies are used in both retrofit and original installation configurations. Compact fluorescent lamp fixture adapters are most useful in retrofitting existing Edison-type ceiling lighting fixtures so those previously installed fixtures can use the energy efficient lighting sources currently available. Particularly, in retrofitted fixtures, constrictive thermal environments create conditions which often cause fluorescent lamps to operate at less than their maximum efficiency.

The operating efficiency and lumen output of compact fluorescent lamps is very sensitive to lamp wall temperatures. Elevated lamp wall temperatures occur as the geometry of the reflector and the lens traps air within the lamp compartment of typical compact fluorescent retrofits. This in turn inhibits desirable cooling of the lamp wall.

Compact fluorescent lamps operate at a maximum efficiency when the mercury pressure inside the fluorescent tube is at its optimum value (e.g. 5 to $6 \times 10^{-3}$ mmHg). Moreover, when the mercury vapor pressure of the fluorescent tube is kept low and the current flowing through the fluorescent lamp is prevented from increasing, the burning of the reactance ballast due to generated heat may be advantageously prevented.

Many residential and commercial retrofit applications of the compact fluorescent lamp use a lensed reflector geometry which results in significant losses in performance due to excess mercury vapor. This constricted configuration is necessary to focus and direct the light output of the lamp.

Convection cooling is most effective when there is an absence of a lens or reflector. In such a case, the compact fluorescent lamp operates near maximum performance. This occurs because the convection cooling allows excess mercury vapor to condense and coalesce at the coolest point on the lamp's surface thereby maintaining an advantageous range of mercury vapor density. This coolspot is located at the lamp tip and is termed the minimum lamp wall temperature (MLWT). The optimum location of the coolspot is at the lamp tip. If the MLWT occurs at this point, the lamp is most efficient.

With the addition of a lens and reflector, however, the compact fluorescent lamp wall temperature rises, causing the system to experience loss of light output and efficacy dye to the lack of an efficient coolspot at the highest density of mercury vapor. The excess mercury vapor results in increased self absorption losses and therefore leads to lower lumen output. Recent experimental work has shown that light output for conventional compact fluorescent lamps can decrease by as much as 30% when operated with a lens and reflector inside a standard fixture.

The benefits of convection cooling are described in U.S. Pat. Nos. 4,375,607 and 4,270,071, the former of which describes a configuration having a very large aperture at the distal end of the light shield or light diffusing member as well as small apertures adjacent the ballast, providing a convection cooling effect of both the lamp and the ballast. The latter references describes a less radical configuration where small apertures are cut into the distal end of the transparent light transmitting housing as well as having small apertures adjacent the ballast.

In each of the aforedescribed approaches, convection cooling is accomplished in varying degrees. However, optical effects of the configurations of apertures on the transmitted light are not considered. Moreover, neither approach provides for the ability to use a reflector to direct light toward the housing's distal end. While the first approach eliminates the possibility that insects will be trapped by the distal end of the lamp housing, the second approach does not. These and other advantages are provided by the above discussed prior art. In general, the major barrier to the inclusion of venting geometries on lensed fixtures has been the potential for dirt and insect accumulation. By including vents means that dirt and insects can enter the can easily and then accumulate to reduce lumen output of the fixture through dirt depreciation.

SUMMARY OF THE INVENTION

The present invention includes a lens which can be coupled to a lamp housing reflector which allows air to pass through the housing, past the lamp. While providing ventilation for the lamp, the lens of the present invention also provides light bending optics for the light which passes therethrough.

The lens includes a central portion which is suspended below the tip of the compact fluorescent lamp. The central portion is positioned by lateral members which can be of any pattern providing large enough apertures in the lens to allow insects and dirt which would otherwise get stuck in the housing to fall through. The lateral members are capable of optically bending light so that the lens directs the light in the most advantageous direction.

DETAILED DESCRIPTION OF THE INVENTION

As will be apparent from the discussion below, both the lens configuration and the housing cooling vents contribute to the convection cooling of the lamp in accordance with the present invention. However, one without the other also provides desirable substantial cooling of the lamp.

Figure 1:
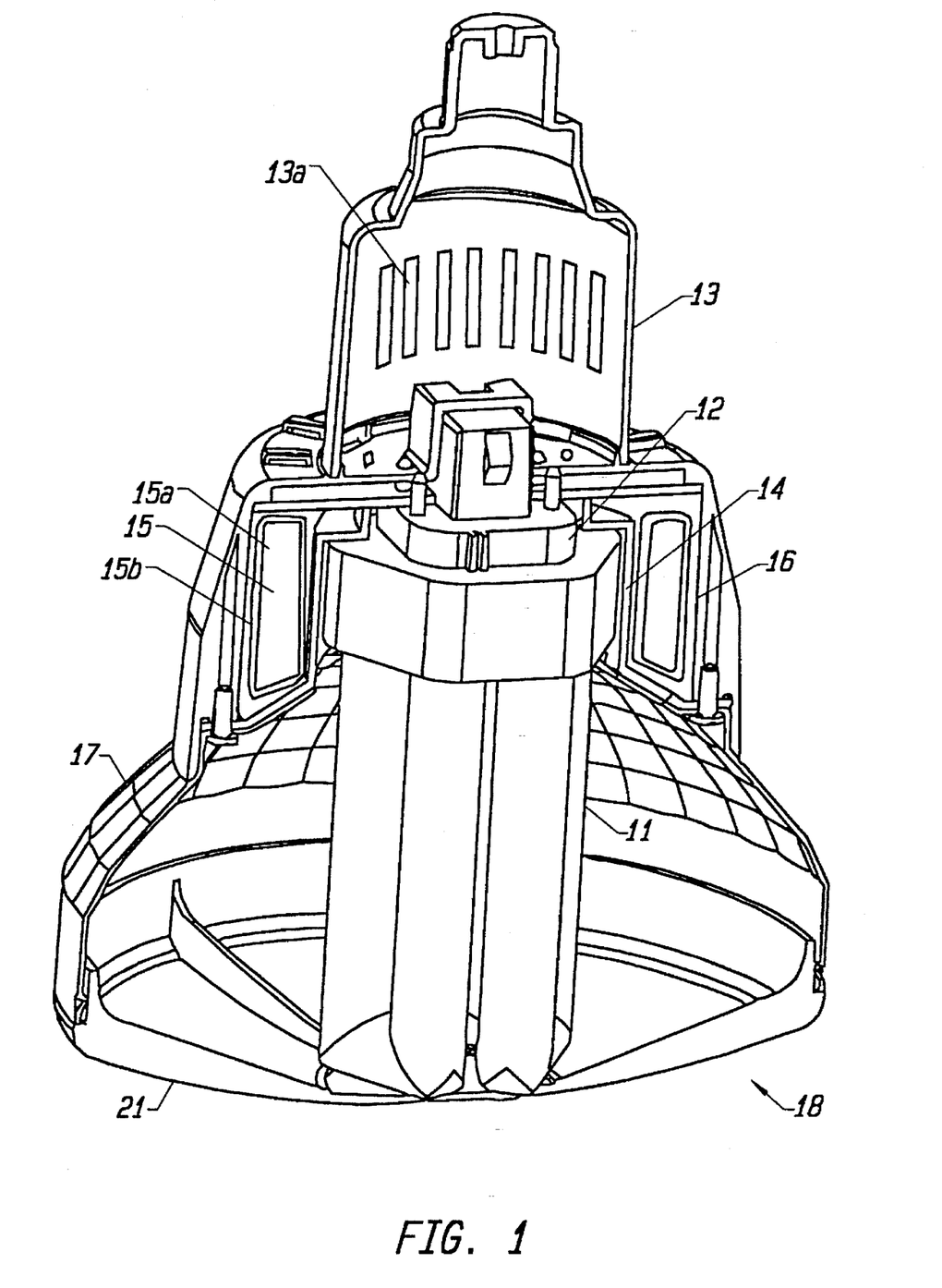
FIG. 1 is cut-away diagram of a compact fluorescent lamp in a reflector type housing coupled to a lens of the present invention.

Referring to FIG. 1, a cut-away diagram of a compact fluorescent lamp in a reflector type housing coupled to a lens of the present invention is shown. This invention is applicable to any type of lighting lamp, such as halide or suitable alternatives. The lamp 11 is connectable to electrical contact housed in contact housing 12 through an opening in the housing. The illuminating lamp 11 in the illustrated embodiment detachably mounted and mechanically and electrically connected at its starter housing to the base connector.

The base connector assembly is an Edison, screw-type base and is housed in base connector housing 13. The base connector allows the fixture to be used for retrofit applications in sockets designed for incandescent lamps. The lamp is detachably mounted so as to allow for its replacement. The width of the base of the illuminating lamp is approximately that of the opening in the ballast housing and reflector assembly through which it is mounted and is recessed in that opening so as to provide a path for air rising through the reflector assembly to vent through the venting apertures as will be discussed in detail below.

A cut-away illustration of a magnetic winded ballast 15 of the torodial type, for example, is shown as housed in a space provided by housing elements 14 and 16. The torodial ballast shown therein has a center magnetic material portion 15a and windings 15b. Another space which would be suitable could house the ballast in the alternative. Moreover, an electronic ballast may be configured to fit into this space or another suitable space.

The reflector assembly 17 is made of a material and has a configuration which will reflect light from the lamp 11 to the distal end 18 of the lamp system. The reflector has a generally parabolic shape truncated at its vertex and extends beyond the tip of the housed fluorescent lamp. The reflector may be manufactured out of any material which is sufficiently rigid and heat resistant. The reflector flares out and its forward edge extends away from the ballast housing.

A lens 21 in accordance with the present invention is shown detachably mounted along the forward edge of the reflector 17. The lens is preferably made of acrylic and is detachable to allow for the compact fluorescent lamp to be replaced when it burns out.

The housing, in general, is constructed out of any of a variety of well known materials having a suitable rigidity and heat resistance. In the preferred embodiment the housing is made substantially out of plastic. The housing in the illustrated embodiment has a generally annular form.

Figure 2:
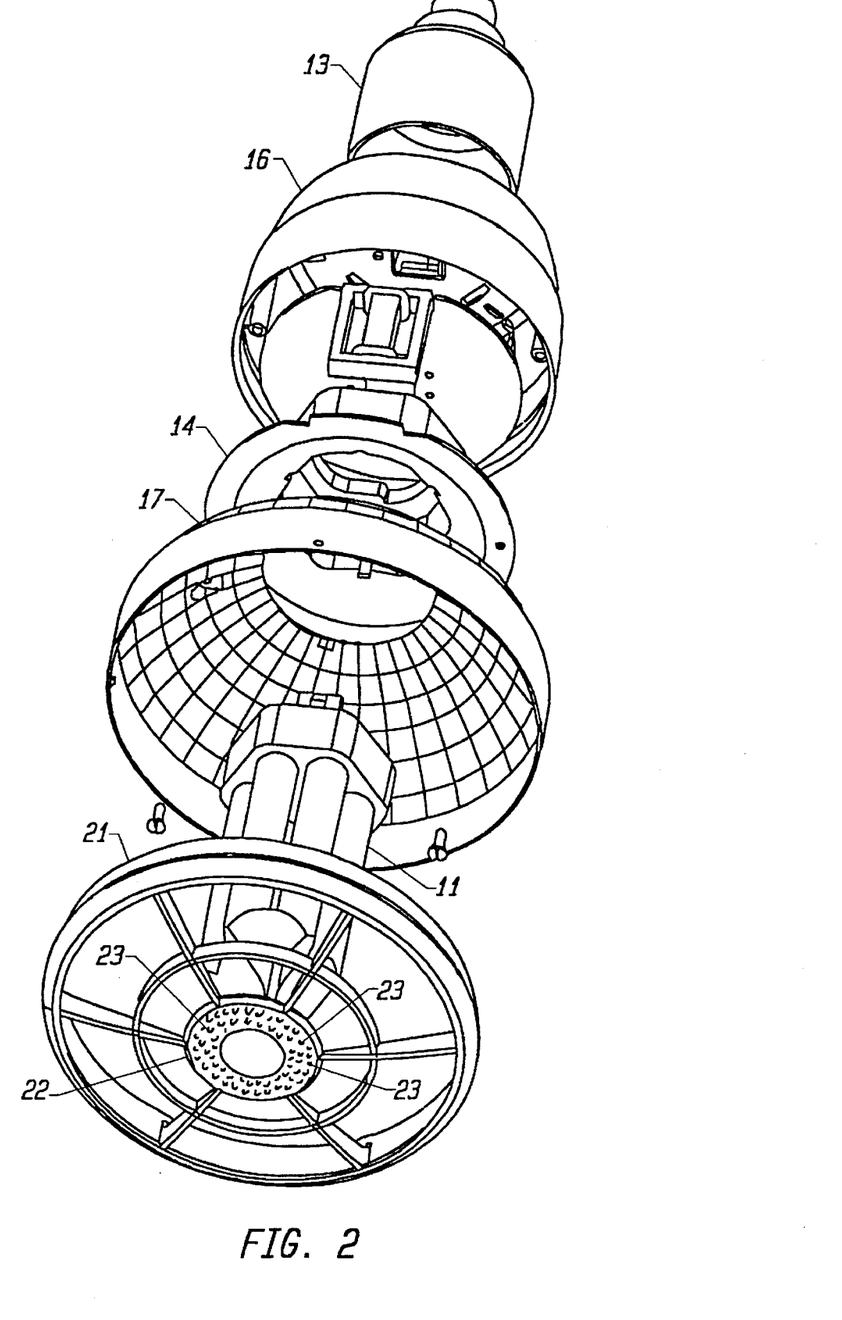
FIG. 2 is an expanded diagram of a system as shown in FIG. 1.

FIG. 2 shows an expanded view of the same features as described with respect to FIG. 1. Central portion 22 of the lens has many utilities and features in accordance with the present invention and is described in detail directly below. A perspective view of the lens 21 is shown in a manner illustrating that the central portion 22 of the lens substantially lines up with the axis of lamp 11. In this manner, light generated at the tip of the compact fluorescent lamp passes through the center of the lens which in accordance with the present invention, is provided with glare control, either by the texture of its surface, its configuration or its material. Texturing can be through frosting or as shown in FIG. 2 by little bumps 23 on the surface of the central portion 22. Of course, either side of the central portion can be textured and the textures themselves can comprise any number of suitable types. Glare control can also be provided by making the center portion slightly opaque or substantially opaque. Moreover, its top surface can be mirrored to reflect the light back to the reflector. The glare control further obscures the source of the light, that is, so that when a user's eyes are directed thereto, the light's intensity does not hurt the eyes.

Figure 3:
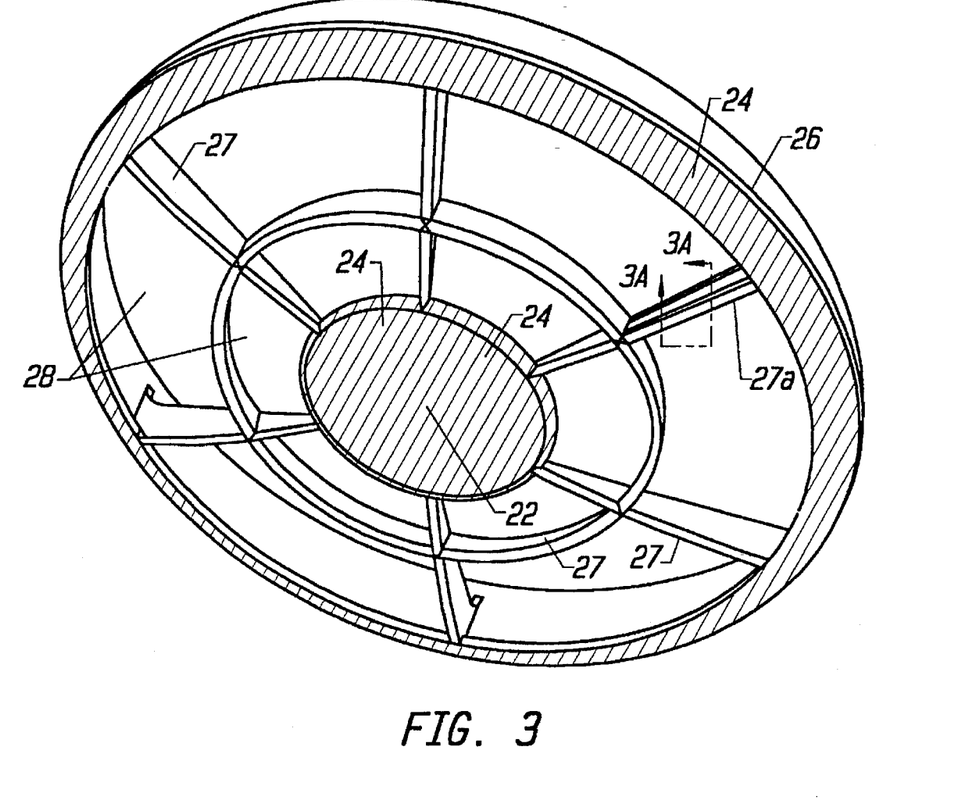
FIG. 3 is a perspective drawing of a lens of the present invention.

FIG. 3 shows a close-up diagram of a similar perspective drawing of the lens as shown in FIG. 2. Texturing of the central portion 22 is shown as lateral lines 24 on its surface. Moreover, the rim 26 of the lens is also shown as having lateral lines 24 for texturing.

The central portion 22 is suspended in position by a plurality of lateral members 27. FIG. 3 shows at least one of the plurality of lateral members in contact with central portion 22. The lateral members are depicted as vein-like but can have any other suitable configuration, including changing thickness or widening from one end to another in any direction. An important feature of the lateral members 27 is that they are configured in a manner which provides that apertures 28 are of a size sufficient to let debris to fall therethrough. The debris of particular concern is that of insects which are commonly attracted to light and which die once inside the housing. The apertured lens of the present invention mitigates dirt accumulation within the lamp and particularly on the lens which leads to lumen depreciation. Since in the past the major barrier to the inclusion of venting geometries on lens fixtures has been the potential for dirt and insect accumulation, the venting geometries of the present invention are desirable. The apertures allow for lamp compartment cooling while particulate material or insects that enter the fixture will not be trapped therein.

Figure 3A:
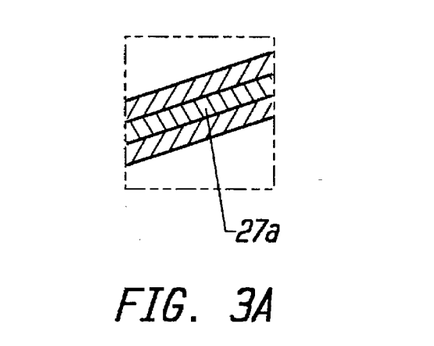
FIG. 3A is an expanded view of a side of a lateral member of the present invention.
Figure 4:
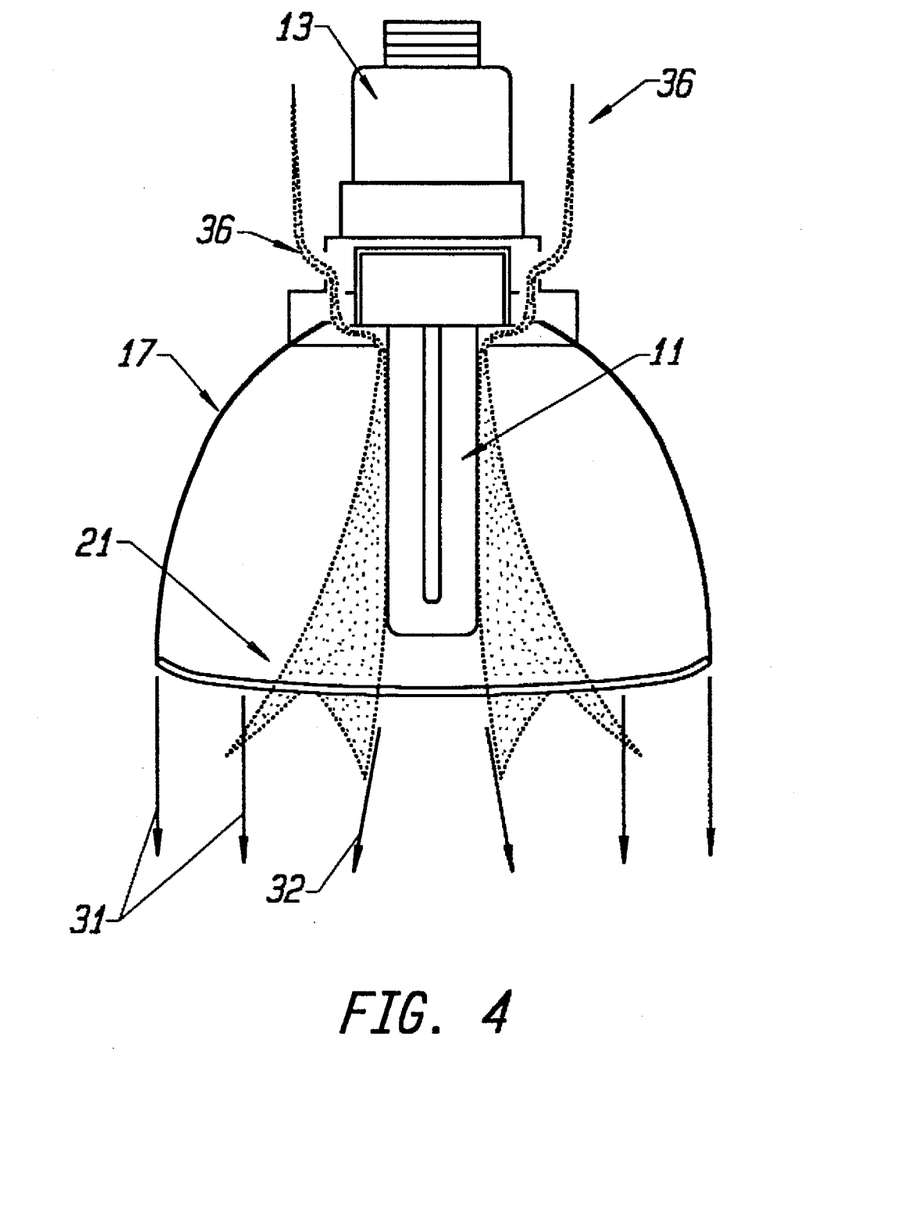
FIG. 4 shows the venting and light patterns of a fluorescent lamp housing system of the present invention.

The lateral members 27 are configured of polished plastic which shields against high angle luminance. The polished plastic reflects light back to the reflector 17 and keeps it from spraying sideways. Turning to FIG. 4, arrows 31 show the preferred direction of the light as it passes through the lens apparatus (i.e. it is not spraying sideways) and shows arrows 32 to illustrate the glare control as discussed above. Referring to FIG. 3A, one alternative to solely using polished plastic for optical enhancement is to configure surfaces 27a of the lateral members 27 with angles for bouncing light to direct the light in particular directions in cooperation with the reflector.

With the combination of the polished lateral members 27 and the low transmission surface of the lens'central portion 22, the apertured lens of the present invention provides optical enhancement in that it allows for increased fixture efficiency by reducing normal transmission losses which would normal result through a solid or continuous lens material. In a preferred embodiment, the series of lens apertures make up approximately 75% of the lens area.

Figure 5:
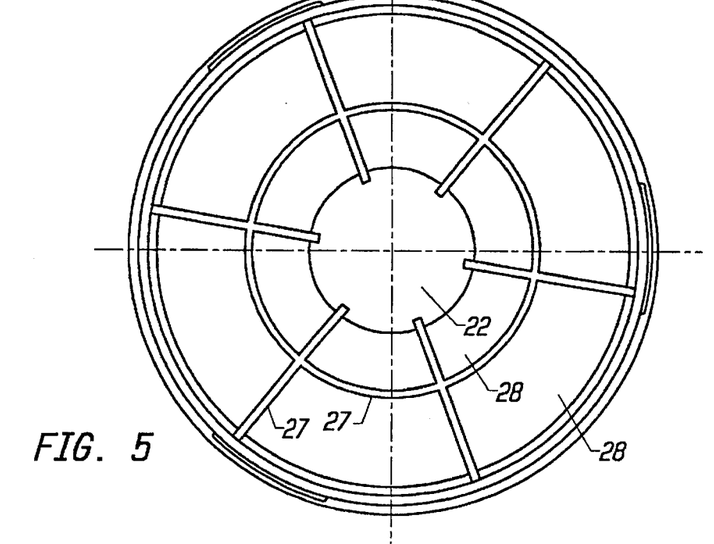
FIG. 5 shows an embodiment of the lens of the present invention.

FIG. 5 illustrates radially configured apertures and lateral members. In the preferred embodiment, the radial fins make up part of the lattice work which defines the apertures. Any thickness of the lateral members in the vertical and horizontal directions are within the scope of the present invention as long as the apertures have sufficiently size to allow for relatively large debris to fall therethrough, particularly that of the size of insects of all sizes.

Figure 6:
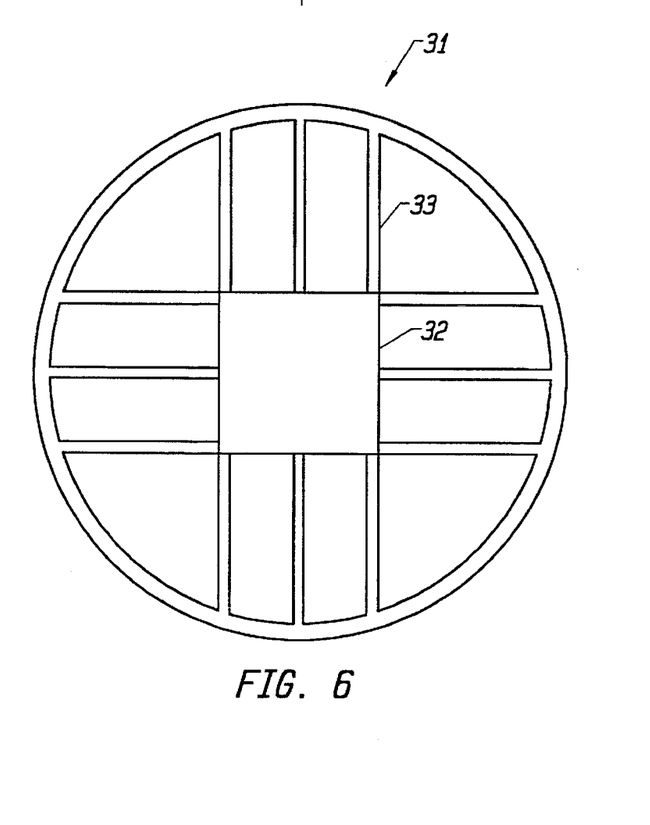
FIG. 6 shows another embodiment of the lens of the present invention.

FIG. 6 on the other hand shows an alternative lens 31 configuration where the central portion 32 is not of a disc shape, but has a different shape, in this case a rectangle. The lateral members 32 furthermore are not radially configured, but instead have a different symmetrical configuration. Symmetry is preferred but not required. Again, preferably, the lateral members make up a lattice work which defines the apertures. In fact, lateral members can be ill-defined or even random in arrangement or configuration in that any apertured area fitting the requirements as described herein would fall within the scope of the present invention. For example, the central lens portion can be positioned by a second lens portion made up of acrylic or other suitable material with very large holes in it, thus creating the apertures of the present invention.

Figure 7:
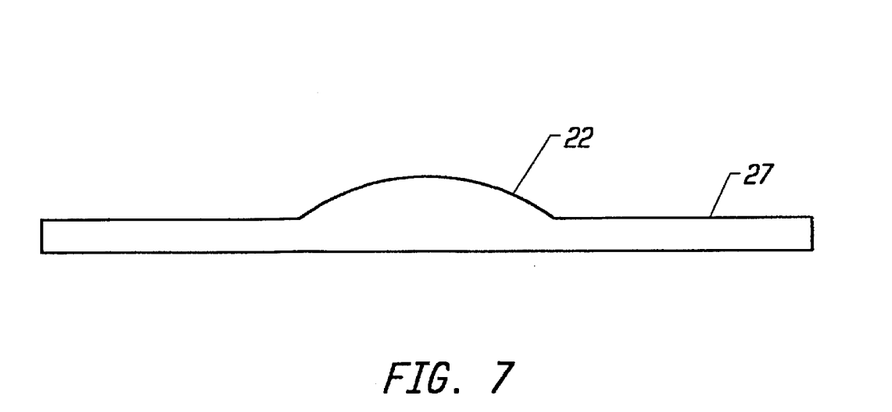
FIG. 7 shows a side view of the lens of the present invention illustrating the sloping central region.

FIG. 7 shows the lens of the present invention from the side. The central portion 22 is shown adjacent lateral members 27. The top side of the central portion 22, that is, the side inside the housing and facing the lamp 11 has a sloping surface so that when bugs or dirt does land thereon, they will slide down the sloping surface and fall through the apertures shown in previous figures. The sloping surface can be of any suitable type, for example, domed, convex or simply angled, for example, like that of a pyramid-type shape. Preferably it is steep enough to cause debris of a light weight to descend down its decline and fall through the apertures.

Returning to FIG. 4, the venting patterns of a fluorescent lamp housing of the present invention are shown. While in operation, the air mass around the tip of the illuminating lamp is heated and rises up through the apertured lens into the reflector assembly, convection currents carry the warm air through the ballast housing along the path formed by the recessed positioning of the illuminating lamp and vents through the ballast venting apertures. Convection venting lowers the MLWT closer to optimum thus increasing lamp efficiency.

Figure 8:
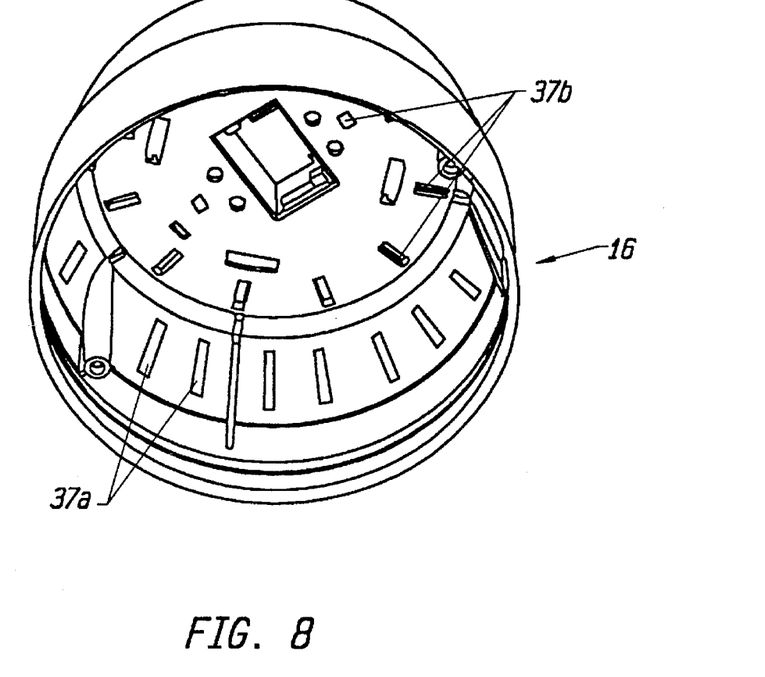
FIG. 8 is a portion of the ballast housing including ventilation apertures in accordance with the present invention.
Figure 9:
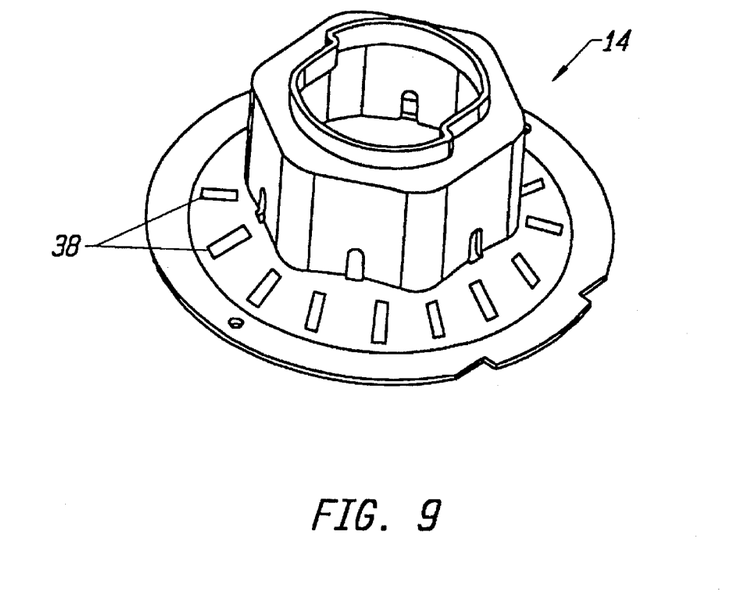
FIG. 9 is another portion of the ballast housing, including ventilation apertures; the top of the ballast housing shown in FIG. 3.

Through a convection process, the air mass follows air flow 36 arrows through the apertures of lens 21, past the lamp 11, cooling it, and then passes through ventilation apertures in the ballast housing. Turning to FIGS. 8 and 9, housing elements 14 and 16 are shown, each with a plurality of venting apertures 37a, 37b and 38, respectively. After the air flow goes past lamp 11, it flows through apertures 38, past the ballast (if it is positioned in this space) and out of the housing through apertures 37 and 37b. The series of ballast venting apertures are arranged along the upper, outer and inner portions of the ballast housing, that is, the ballast venting apertures 37a, 37b and 38 in the preferred embodiment, are arranged horizontally and radially around the upper portion of the ballast housing. This arrangement has been found to be the most effective method for venting the fixture.

The position and arrangement of the ballast ventilation apertures depends upon the position and type of ballast. It is preferable that the ventilation apertures allow the convection process to freely take place through the entire system.

The convection process is enhanced if the upper portion of the fixture includes ventilation apertures as well. If ventilation vents 13a in the lamp socket housing are included (see FIG. 1) the convection cooling will allow the air flow to pass therethrough as well. The lamp socket housing 13 houses the lamp socket which is electrically connected to the ballast.

The placement of the ballast ventilation apertures or the lamp socket ventilation apertures according to the present invention allows air to enter the fixture vertical or directly to cool the end of the lamp. Moreover, the lamp setback in the base of the reflector allows convection by-pass through the lamp compartment and reflector without using apertures directly within the reflector wall. This eliminates the optical losses which would be caused were vents to be positioned on the reflector 17 itself.

Figure 10:
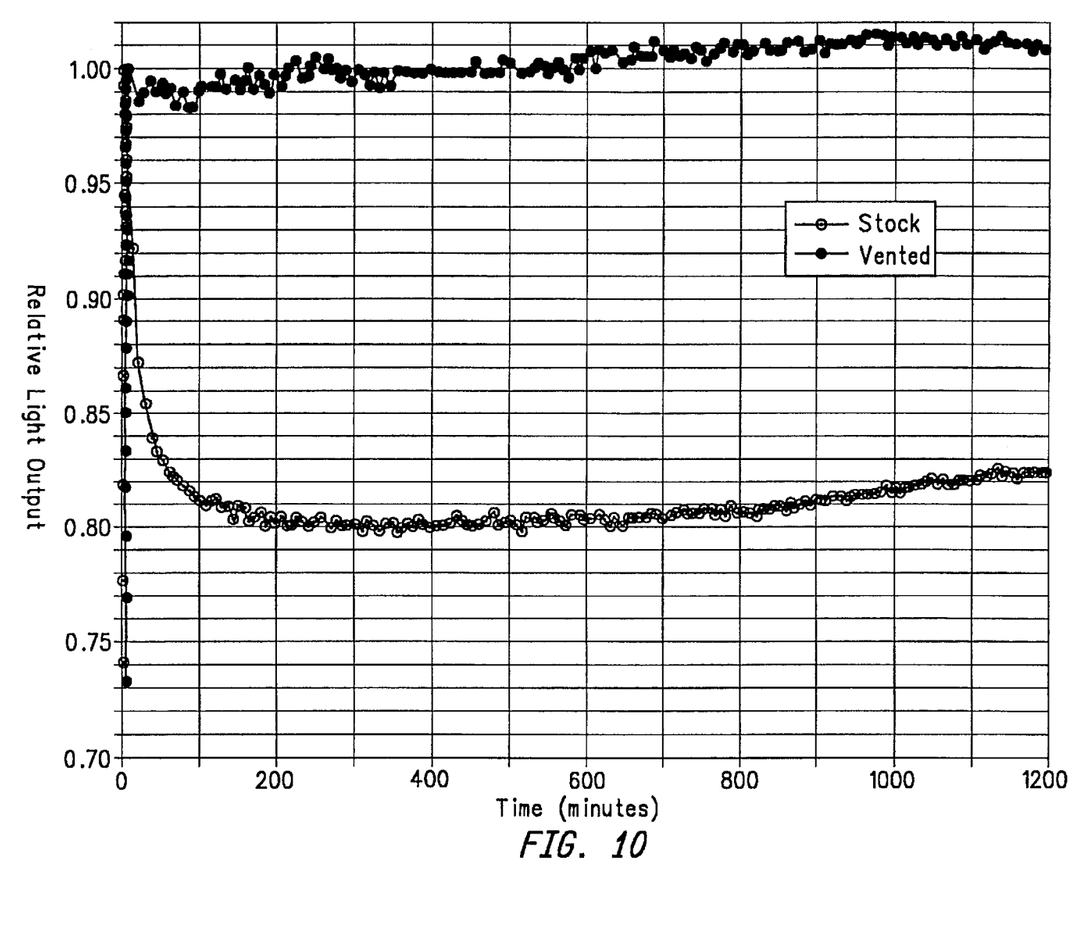
FIG. 10 is a graph showing the relative light output for both a stock and a system in a standard can including features of the present invention.
Figure 11:
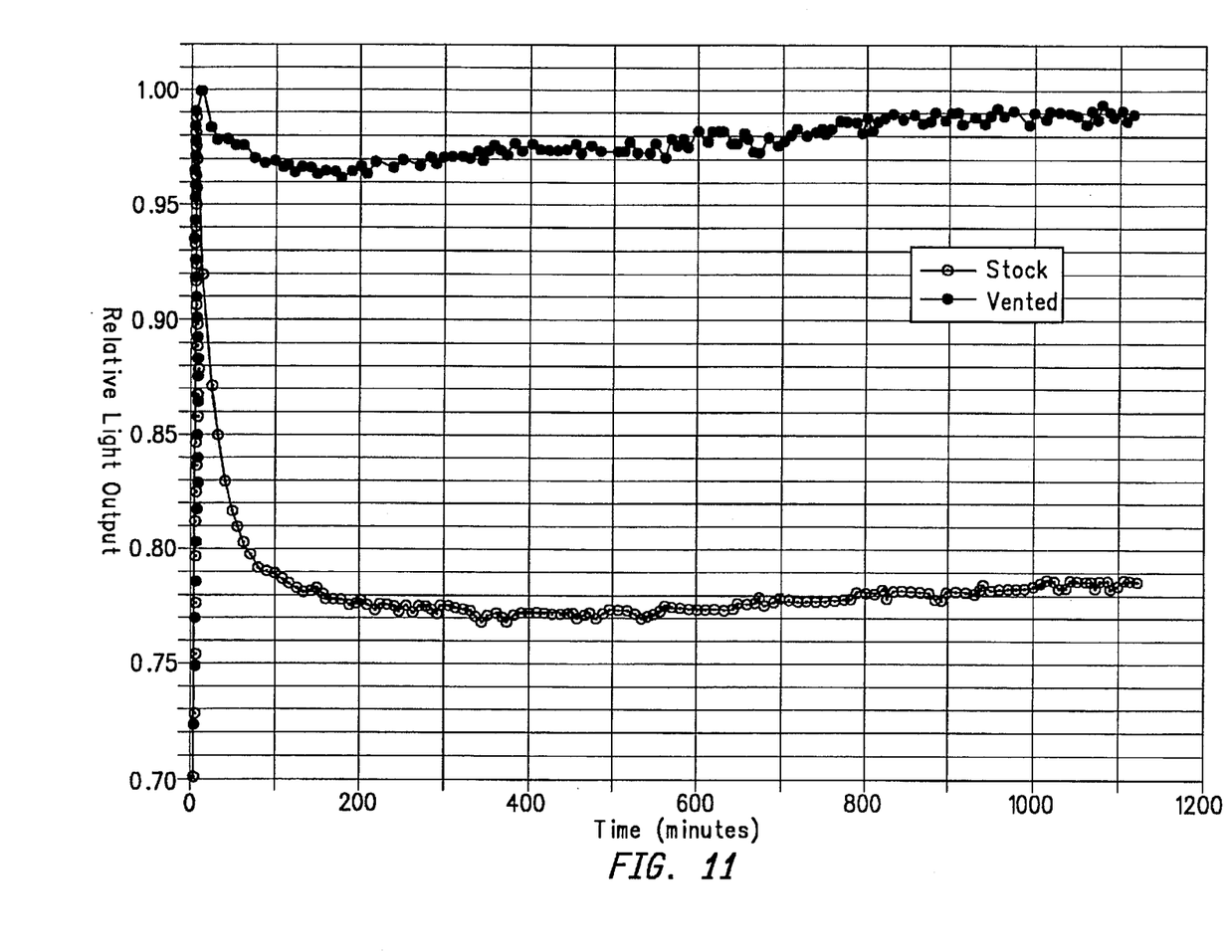
FIG. 11 is a graph shown the relative light output for both a stock and a system in a sealed can including features of the present invention.

It has been found that with the increase in light output due to convection venting the 13 Watt compact fluorescent lamp used in the experiments stays very close to optimal output. FIG. 10 is a graph showing the relative light output for both a stock and the inventive R-type fixture in a standard can. FIG. 11, on the other hand, is a graph showing the relative light output for both a stock and the present invention in a sealed can.

One skilled in the art can make various changes and substitutions to the layout of parts without departing from the spirit and scope of the present invention.

We claim:

1. A lamp fixture including a lamp illumination assembly having a ballast, said lamp illuminating assembly housed in a housing, said lamp fixture comprising:

a reflector coupled to said housing at a first end, said reflector capable of reflecting light from its interior through an opening a second end;

a lens element coupled to said reflector at said second end, said lens element having a central lens portion being a solid piece having optical properties capable of directing light and positioned so that said central lens portion is suspended in position by a plurality of lateral members, at least one which contacts said central lens portion; and wherein said central lens portion has a top surface and a bottom surface, said top surface facing said reflector, said bottom surface facing away from said reflector and wherein said central lens portion's top surface is convexly sloped.

2. A lens as recited in claim 1 wherein said lateral members are positioned radially with respect to said central lens portion.

3. A fixture as recited in claim 1 wherein said housing includes vents positioned in a manner which allows air to pass therethrough to thereby provide for the cooling of said ballast.

4. A lens as recited in claim 1 wherein said central lens portion is configured in a manner which provides glare control.

5. A lens as recited in claim 1 wherein said central lens portion is comprised of a material which provides glare control.

6. A lens as recited in claim 1 wherein said central lens portion is textured so that said central lens portion provides glare control.

7. A lens as recited in claim 1 wherein said lateral members are constructed of a material having properties which allows said lateral members to be configured in a manner which directs light in a predetermined direction.

8. A lens as recited in claim 7 wherein said lateral members are configured to transmit light to said reflector.

9. A lamp fixture lens, comprising:

a plastic lens member capable of directing light and configured so that said plastic lens member is attachable to a lamp fixture adjacent a reflector wherein said plastic member has a plurality of apertures substantially large enough to allow insect-sized particles to pass therethrough;

wherein said lens has a central lens portion which is supported by a plurality of lateral members and wherein said lateral members are constructed of a material having properties which allows said lateral members to be configured in a manner which reflects light in a specific direction; and wherein said specific direction of light reflection is towards said reflector when said plastic lens member is coupled thereto.

10. A lamp fixture lens as recited in claim 9 wherein said lens has a central portion and wherein said apertures are formed by lateral members lateral to said central portion which includes a sloped region.

11. A lamp fixture lens as recited in claim 10 wherein said lateral members support said sloped region.

12. A lamp fixture lens as recited in claim 10 wherein said apertures are positioned radially to said sloped region.

13. A lamp fixture lens as recited in claim 9 wherein said lens has a central portion which includes a sloped region configured to provide glare control.

14. A lamp fixture lens as recited in claim 9 wherein said lamp fixture further includes a lamp illuminating assembly having a ballast, said lamp illuminating assembly housed in a housing, said lamp fixture comprising:

a reflector coupled to said housing at a first end, said reflector capable of reflecting light from its interior through an opening at a second end.

15. A lamp fixture as recited in claim 14 wherein said housing includes vents positioned in a manner which allows ambient air to pass past said ballast thereby providing for the cooling of said ballast.

16. A lamp fixture lens configured to be attachable to a lamp fixture apparatus, said lens comprising:

a first lens portion;

a second lens portion coupled to said first lens portion, said second portion configured to position said first lens portion at its center;

said first lens portion having a top surface facing into said lamp fixture and a bottom surface facing away from said lamp fixture and wherein said top surface is convexly sloping.

17. A lens as recited in claim 16, wherein said second lens portion includes apertures substantially large enough to allow insect-sized particles to pass therethrough.

18. A lens as recited in claim 17 wherein said apertures are formed by lateral members which support said first lens portion.

19. A lens as recited in claim 18 wherein said lateral members are interconnected.

20. A lens as recited in claim 18 wherein said apertures are positioned radially to said first lens portion.

21. A lamp fixture lens as recited in claim 16 wherein said lamp fixture further includes a lamp illuminating assembly having ballast, said lamp illuminating assembly housed in a housing, said lamp fixture comprising:

a reflector coupled to said housing at a fist end, said reflector capable of reflecting light from its interior through an opening at a second end.

22. A lamp fixture as recited in claim 21 wherein said housing includes vents positioned in a manner which allows air to pass therethrough thereby providing for the cooling of said ballast.

23. A lens as recited in claim 16 wherein said first lens portion is configured to provide glare control.

24. A lens as recited in claim 16 wherein said first lens portion is comprised of a material which provides glare control.

25. A lens as recited in claim 16 wherein said first lens portion is textured so that said first lens portion provides glare control.

\* \* \* \* \*